US012623780B2

(12) United States Patent
Carff et al.

(10) Patent No.: US 12,623,780 B2
(45) Date of Patent: May 12, 2026

(54) DRONE ADAPTER FOR DROPPING SPOON-BASED DEVICES

(71) Applicant: FLORIDA INSTITUTE FOR HUMAN AND MACHINE COGNITION INC., Pensacola, FL (US)

(72) Inventors: John Carff, Pensacola, FL (US); Matthew Johnson, Pensacola, FL (US)

(73) Assignee: FLORIDA INSTITUTE FOR HUMAN AND MACHINE COGNITION INC., Pensacola, FL (US)

( * ) Notice: Subject to any disclaimer, the term of this patent is extended or adjusted under 35 U.S.C. 154(b) by 324 days.

(21) Appl. No.: 18/237,184

(22) Filed: Aug. 23, 2023

(65) Prior Publication Data

US 2025/0066019 A1 Feb. 27, 2025

(51) Int. Cl.
| | |
|---|---|
| *F42B 27/00* | (2006.01) |
| *B64D 1/02* | (2006.01) |
| *B64D 1/04* | (2006.01) |
| *B64U 101/18* | (2023.01) |
| *F42B 12/46* | (2006.01) |

(52) U.S. Cl.
CPC ................. *B64D 1/02* (2013.01); *B64D 1/04* (2013.01); *F42B 12/46* (2013.01); *F42B 27/00* (2013.01); *B64U 2101/18* (2023.01)

(58) Field of Classification Search
CPC .............................. B64U 2101/18; B64D 1/04
See application file for complete search history.

(56) References Cited

U.S. PATENT DOCUMENTS

| | | | | |
|---|---|---|---|---|
| 2,826,119 A | * | 3/1958 | Barrowman | ............ F42B 19/46 294/82.26 |
| 2019/0092468 A1 | * | 3/2019 | Deutsch | ................... B64D 1/22 |
| 2025/0066019 A1 | * | 2/2025 | Carff | ........................ B64D 1/02 |
| 2025/0180095 A1 | * | 6/2025 | Buzzard | ................... H02G 1/02 |

FOREIGN PATENT DOCUMENTS

| | | | | | |
|---|---|---|---|---|---|
| CN | 205131678 U | * | 4/2016 | | |
| CN | 210284655 U | * | 4/2020 | | |
| CN | 111591447 A | * | 8/2020 | ............... | B64D 1/06 |
| CN | 114132505 A | * | 3/2022 | ............. | A62C 3/025 |
| CN | 116750192 A | * | 9/2023 | ............... | B64D 1/06 |
| CN | 119840835 A | * | 4/2025 | ............. | B64U 20/80 |
| CN | 119858658 A | * | 4/2025 | ............. | B64U 10/14 |
| ES | 2750880 A1 | * | 3/2020 | ............... | A44C 5/12 |
| KR | 20200059519 A | * | 5/2020 | ............. | A62C 3/025 |

(Continued)

*Primary Examiner* — Gabriel J. Klein
(74) *Attorney, Agent, or Firm* — Jacob M. Ward; Ward Law Office LLC

(57) ABSTRACT

A system and method allowing spoon-based devices to be carried and dropped by a drone. The preferred embodiments are adapted for use with a drone having a retracting drop shaft release mechanism. First and second adapter portions are provided. These clamp around the body of a spoon-based device and hold the spoon-based device. The lower regions of the first and second adapter portions are joined by a pivot joint. The upper regions each include an engagement feature such as an upstanding tang portion. These first and second tang portions are engaged to the drone's release unit.

20 Claims, 12 Drawing Sheets

(56)                    References Cited

FOREIGN PATENT DOCUMENTS

| | | | | | |
|---|---|---|---|---|---|
| KR | 20210021197 | A | * | 2/2021 | ............. B64U 10/13 |
| KR | 20210039792 | A | * | 4/2021 | ............. F42B 39/02 |
| KR | 102322098 | B1 | * | 11/2021 | ............. G01S 17/08 |
| KR | 20230161077 | A | * | 11/2023 | ............. B64U 10/13 |
| KR | 20250079261 | A | * | 6/2025 | ............. F42C 14/02 |
| RU | 220486 | U1 | * | 9/2023 | |
| RU | 231466 | U1 | * | 1/2025 | |
| RU | 233916 | U1 | * | 5/2025 | |
| TR | 2024000120 | A1 | * | 7/2025 | |
| TW | M517715 | U | * | 2/2016 | ............. A62B 99/00 |
| WO | WO-2018063076 | A1 | * | 4/2018 | ............. F41G 3/165 |

* cited by examiner

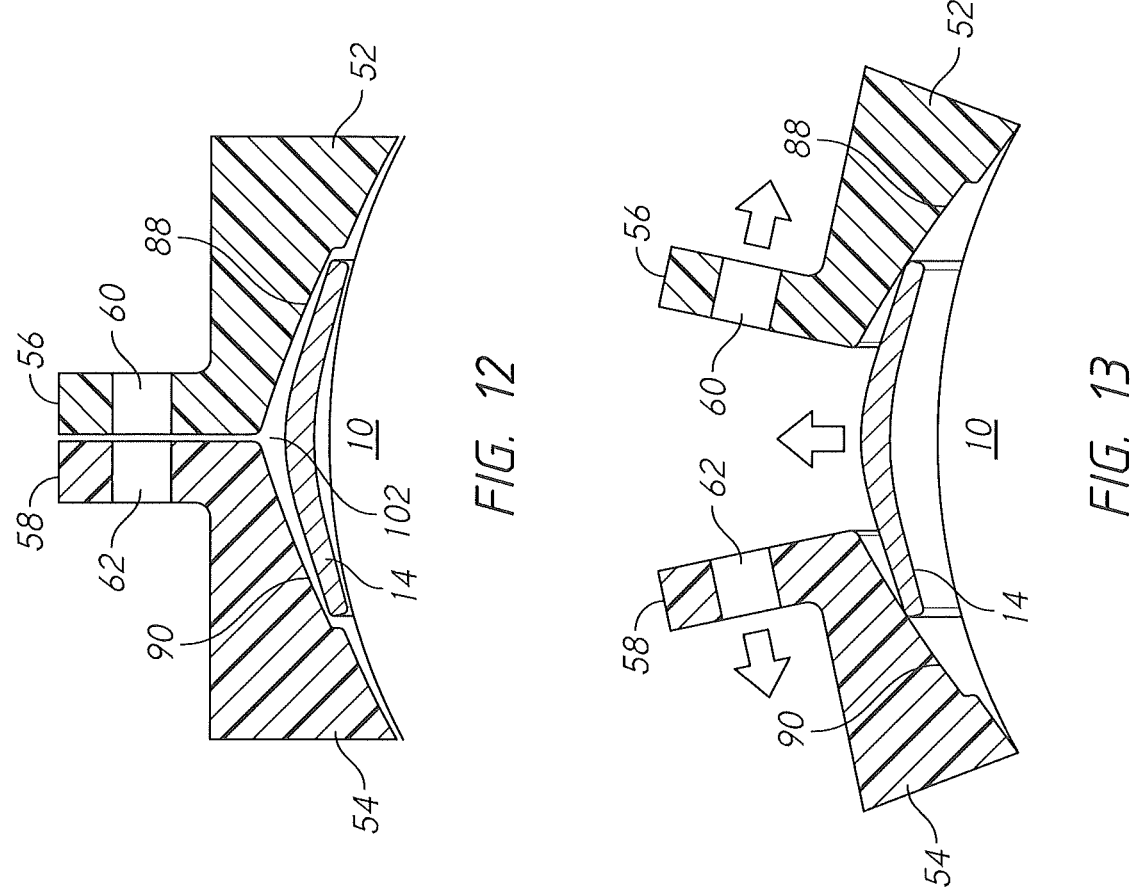
FIG. 12
FIG. 13
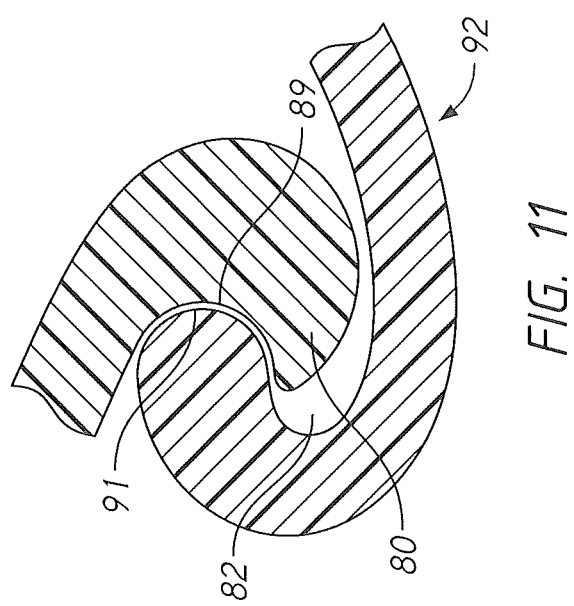
FIG. 11

DRONE ADAPTER FOR DROPPING SPOON-BASED DEVICES

CROSS-REFERENCES TO RELATED APPLICATIONS

Not applicable

STATEMENT REGARDING FEDERALLY SPONSORED RESEARCH OR DEVELOPMENT

Not applicable

MICROFICHE APPENDIX

Not Applicable

BACKGROUND OF THE INVENTION

1. Field of the Invention

The present invention pertains to the field of drones. More specifically, the invention comprises an adapter allowing a spoon-based device to be carried and dropped by a drone.

2. Description of the Related Art

The present invention provides the ability for a prior art drone to carry and drop a prior art spoon-based device. As those skilled in the art will know, a "drone" is a flying vehicle that can be maneuvered in a controlled fashion. Many drones are controlled by a remote operator, but some are completely autonomous. This invention applies to either class.

The term "spoon-based device" will not be uniformly familiar to those skilled in the relevant arts and some explanation is therefore appropriate. Spoon-based devices are descended from hand grenade designs of the early to mid-twentieth century. FIG. 1 shows an example. This exemplary spoon-based device 10 includes a canister filled with CS gas (often referred to as "tear gas"). Fuse assembly 22 screws into the canister and serves to initiate the dispersal of the canister's contents.

Such devices are generally thrown or otherwise projected away from the user before dispersal begins. A time delay is therefore included. It is also important to ensure that the device is not actuated accidentally. A pin and safety lever are provided to prevent unwanted actuation. In the nomenclature used by United States military and police personnel, the safety lever is called a "spoon"—likely because its free end resembles the handle of a common dining spoon. The term "spoon" will be used in this disclosure. Devices in which the motion of a spoon are part of the actuation process are therefore called "spoon-based devices."

Looking at FIG. 1, the reader will note that spoon 14—typically a rigid metal stamping—is pivotally connected to fuse assembly 22 by pivot 16. A spring internal to the fuse assembly is configured to pivot the spoon about pivot 16 and urge the portion of spoon 14 lying proximate canister 12 out and away from canister 12. As is well known in the field, when the spoon pivots away from the canister the firing mechanism is actuated and a delay fuse is initiated. The actuated position is shown in FIG. 2. After a fixed interval—usually 2 to 4 seconds—the main igniter fires and the CS gas begins pouring from canister 12.

It is obviously important to securely retain spoon 14 in the "safe" position shown in FIG. 1. To that end, a pin 18 is passed through aligned bores in spoon 14 and fuse assembly 22. The pin is typically provided with one or more circumferential grooves that serve to retain it in the safe position. Ring 20 is attached to one exposed end of pin 18. The ring allows the user to easily grip the pin.

In order to activate the spoon-based device of FIG. 1 the user first wraps his or her hand around the spoon and canister and squeezes the spoon against the canister. The user next grasps ring 20 and pulls pin 18 free of the bores through the spoon and the fuse assembly. Then the user throws the device. The throwing motion releases the spoon—which pops outward as shown in FIG. 2. This action actuates the firing mechanism within fuse assembly 22. The firing mechanism initiates a delay fuse. Following the proscribed delay time, the CS gas is ejected from the canister.

As those skilled in the art will know, there are many different types of spoon-based devices. These include CS gas canisters, smoke canisters, dye-deploying canisters, flash/bang devices, and fragmentation grenades. Not all these devices have a cylindrical canister 12 as shown in the example of FIG. 1. Some are spherical and some are oblong. For this reason the largest portion of the spoon-based device will be called a "body." Canister 12 is an example of a body. Those skilled in the art will also know that many different fuse assembly types, spoon types, and spoon connections are used. In some examples the fuse assembly is integrated within the body and the spoon is pivotally connected to the body itself. In still other examples the pin is secured in different ways—such as a receiving channel in the spoon or body. The present invention can be adapted for use with all these types.

All these spoon-based devices are propelled toward a target area. They are often thrown by a human user. Some lobbing devices are also employed, but these just extend the range available to a human thrower. The deployment range is thus limited.

It would be advantageous to provide a system for remotely deploying spoon-based devices, particularly in light of the recent advances in drone technology. FIG. 3 shows a prior art drone 28 as typically used by law enforcement agencies. Chassis 30 contains a control system. This control system receives attitude and acceleration information from an instrument package that allows the determination of a six degree-of-freedom position and orientation solution. The position calculations are periodically supplemented and corrected by GPS data. The control system also often includes ranging detectors for automated collision avoidance and station keeping in a complex environment.

In the exemplary drone pictured, four motors 34 are mounted on long outriggers 32. Each motor spins an attached pair of blades 36 in order to provide lifting force. As those working in this field will realize, the use of four motors in the arrangement pictured allows the drone to lift off, hover, maneuver, transit, etc. Skids 38 are provided so that the chassis remains above a surface when the drone lands. Payload gear is often mounted beneath the chassis and above the level of the skids. Exemplary payloads include video cameras (visual and infrared), mobile lights, and various sensors. Such devices are very useful in police work.

Prior art drones such as shown in FIG. 3 have been modified to provide a payload dropping capability. As an example, a life preserver can be carried to a point directly over a swimmer in need of rescue and dropped. There are many different drop systems on the market. FIGS. 4-6 show a typical example.

In the example of FIG. 4, payload frame 40 is connected below chassis 30. Release unit 42 is attached to payload frame 40. A wiring harness connects the release unit to the control system in the chassis so that the radio link used to control the drone can also be used to drop the payload. In other examples a separate control link is provided directly to the release unit. Notch 46 is provided in the release unit. Drop shaft 44 selectively extends across this notch. Activation of the drop unit causes the drop shaft to retract to the right (in the orientation shown in the view).

FIG. 5 provides a detailed perspective view of drop unit 42. Drop shaft 44 is slidably mounted in bore 48. When the drop unit is activated, the drop shaft retracts toward the right. FIG. 6 shows this retraction motion in detail. Drop shaft 44 has retracted so that no portion of the drop shaft rests within notch 46. A typical payload is actually loaded with the drop shaft in the position shown in FIG. 6. The payload is often provided with a ring on the end of a flexible leader. The ring is placed in the open notch shown in FIG. 6. The state of the release unit is then changed so that the drop shaft extends back across the notch as shown in FIG. 5. This captures the ring. When the drone lifts off it carries the payload aloft and carries it until the release unit is commanded to again retract the drop shaft. When the drop shaft is retracted the ring falls out of the notch and the payload drops.

The mechanism driving the drop shaft can assume many forms. A simple solenoid can be used. A crank arm on a rotary servo motor can also be used. A screw drive can be used for more precise motion control where desired. Many other mechanisms can be employed as well. The present invention can be used with any of these.

It would be desirable to provide a system and device allowing a spoon-based device to be carried by a drone and dropped using conventional payload release mechanisms. The present invention provides such a device.

BRIEF SUMMARY OF THE INVENTION

The present invention comprises a system and method allowing spoon-based devices to be carried and dropped by a drone. The preferred embodiments are adapted for use with a drone having a retracting drop shaft release mechanism. First and second adapter portions are provided. These clamp around the body of a spoon-based device and hold the spoon-based device. The lower regions of the first and second adapter portions are joined by a pivot joint. The upper regions each include an engagement feature such as an upstanding tang portion. These first and second tang portions have aligned transverse bores. A spoon receiver is preferably provided by two angled surfaces on the inward facing surfaces of the first and second adapter portions located proximate the tang portions.

A spoon-based device is prepared for drone deployment by clamping the first and second adapter portions around the body of the spoon-based device, with the spoon secured within the spoon receiver (and thereby held against the body of the spoon-based device). With the spoon-based device thus secured, the first and second tang portions are placed within a drone's release unit. The drop shaft of the release unit is then passed through the aligned bores in the first and second tang portions. Thus, configured, the lower regions of the first and second adapter portions are held together via the releasing pivot joint. The upper regions of the first and second adapter portions are held together by the drop shaft of the release mechanism. The spoon is held within the spoon receiver and thus clamped firmly against the body.

The user then pulls the pin from the spoon-based device. The drone flies the spoon-based device to a desired drop position and activates the release unit. When the drop shaft of the release unit is pulled, the spoon-based device and the attached first and second adapter portions fall free. The spoon pushes outward and springs open the upper regions of the adapter portions. As the upper portions pivot free from each other the adapter portions fall away from the spoon-based device. The spoon-based device is actuated when the spoon pivots outward and initiation of the device then follows its designed progression.

BRIEF DESCRIPTION OF THE SEVERAL
VIEWS OF THE DRAWINGS

FIG. 11 is a detailed sectional view, showing the releasing pivoting joint.

FIG. 12 is a detailed sectional view, showing the interaction of the spoon and the spoon receiver.

FIG. 13 is a detailed section view, showing how the outward movement of the spoon forces open one end of the first and second adapter portions.

REFERENCE NUMERALS IN THE DRAWINGS

Figure 2:
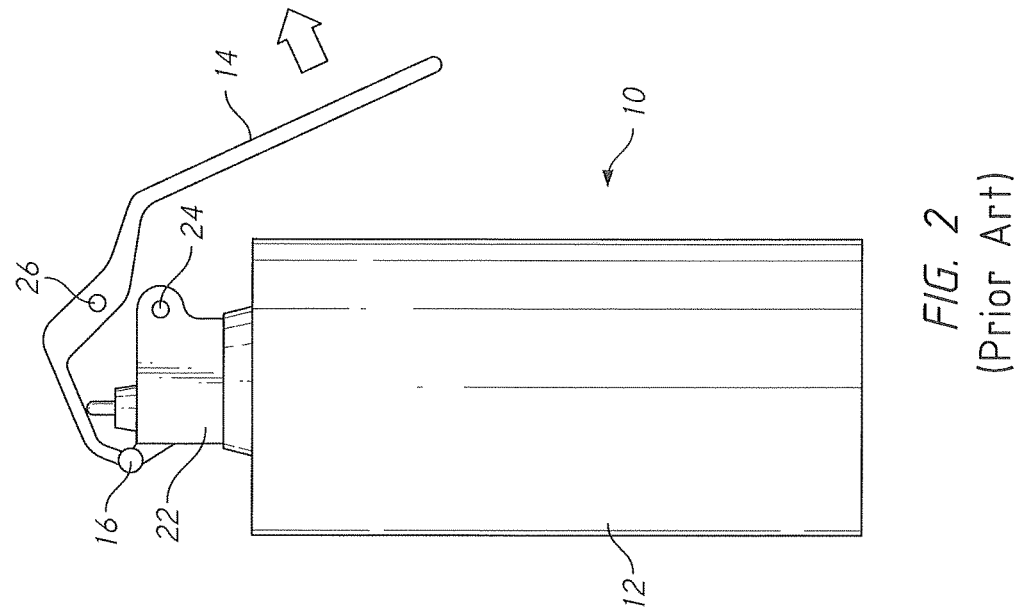
FIG. 2 is an elevation view, showing the activation of the device shown in FIG. 1.
Figure 1:
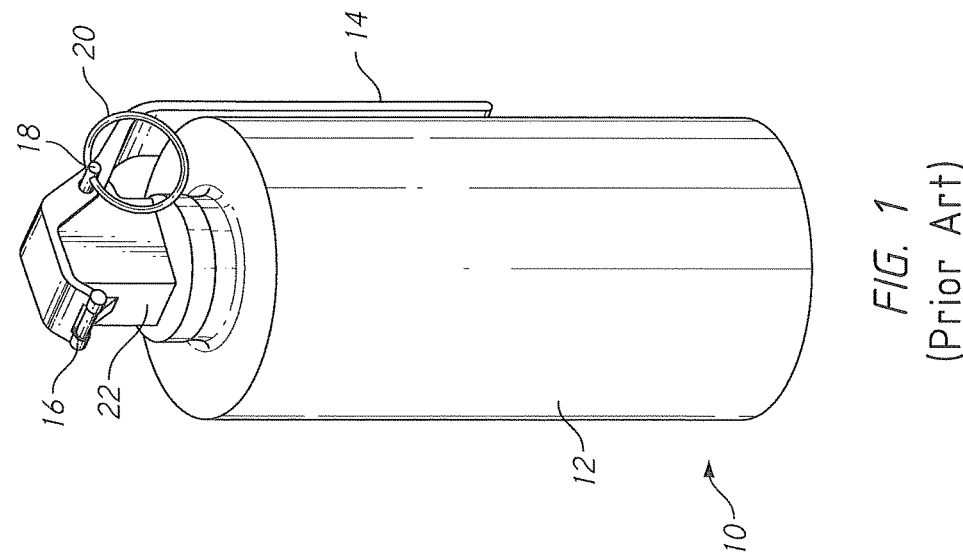
FIG. 1 is a perspective view, showing a prior art spoon-based device.
Figure 3:
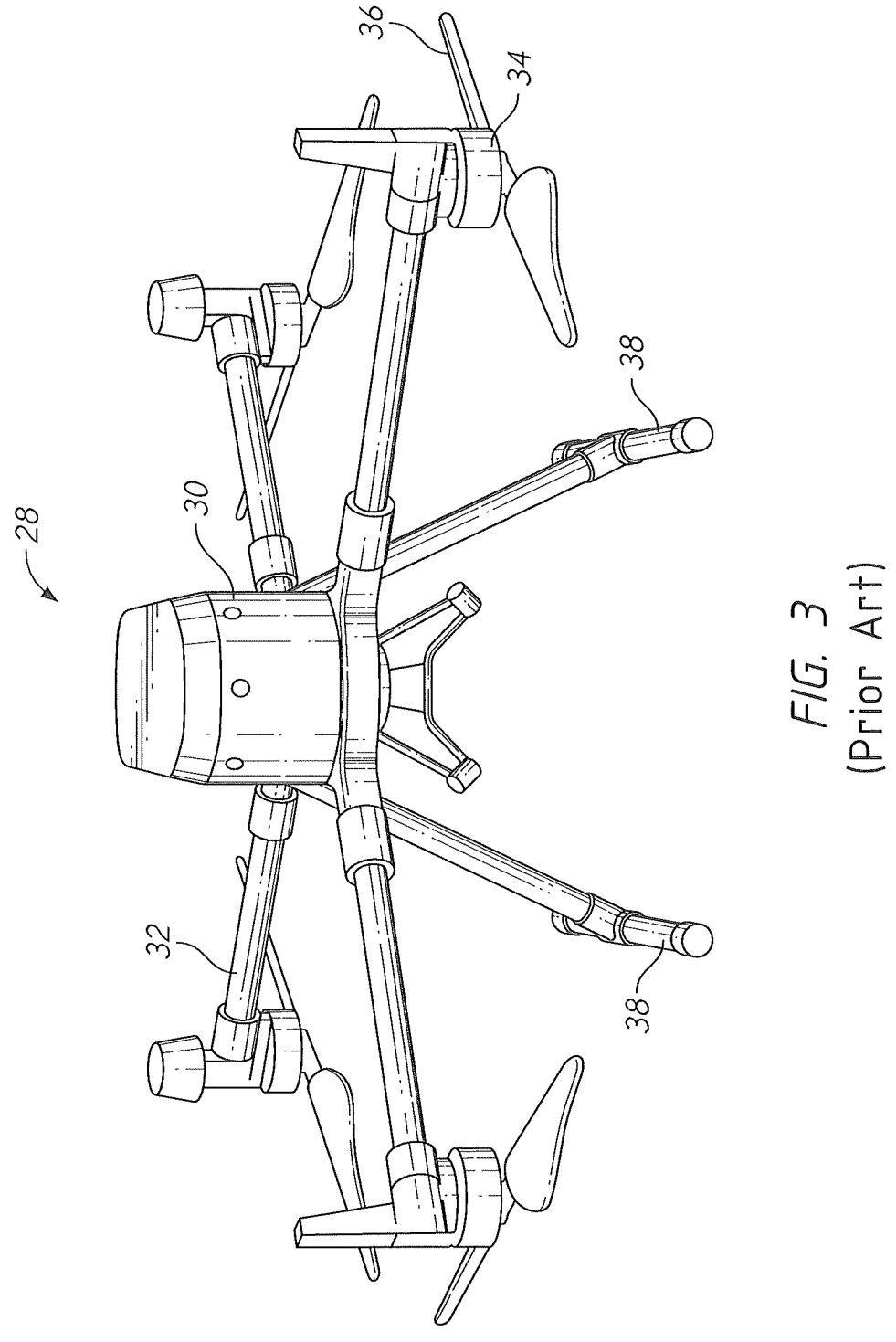
FIG. 3 is a perspective view, showing a prior art drone.
Figure 4:
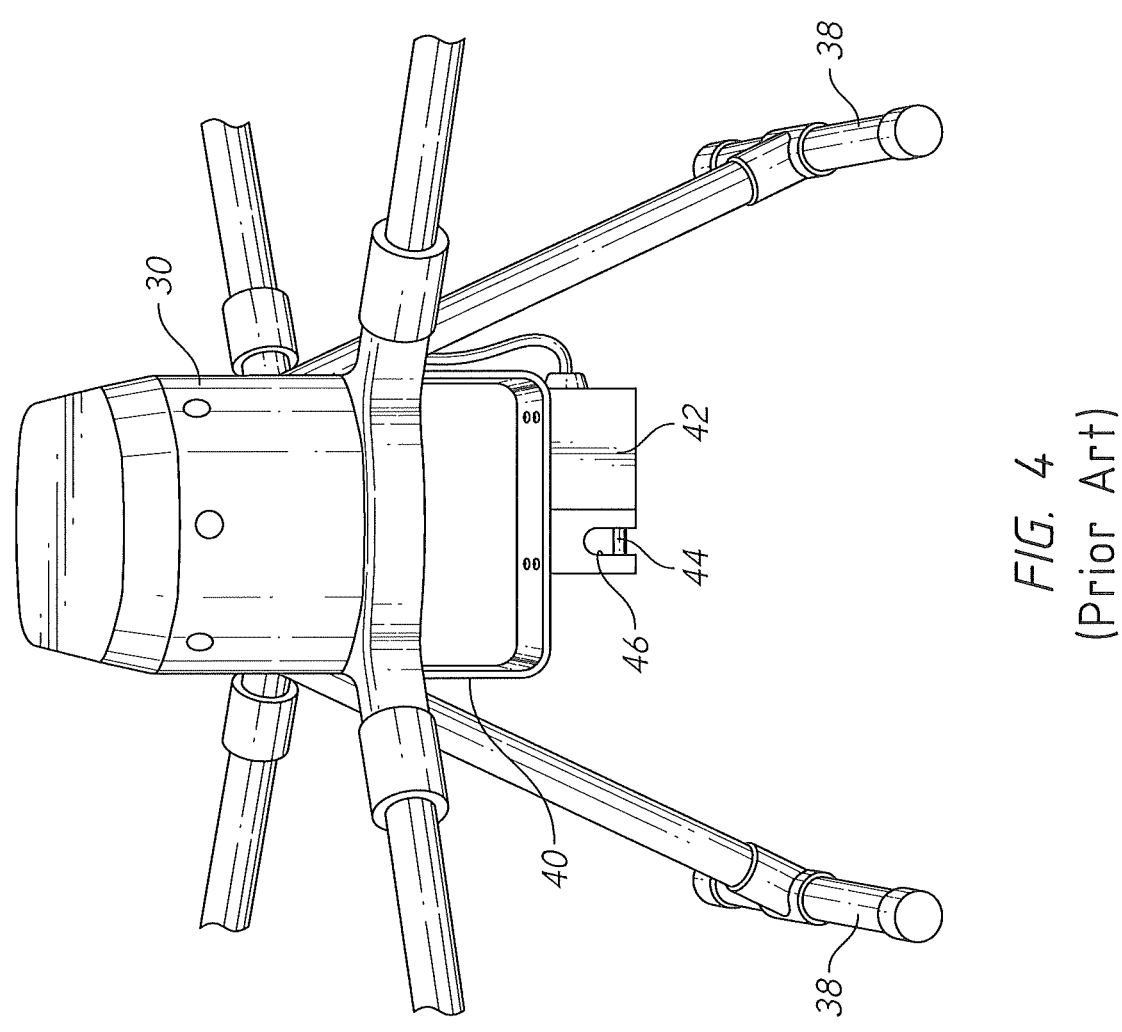
FIG. 4 is a perspective view, showing a prior art release unit attached to a prior art drone.
Figure 5:
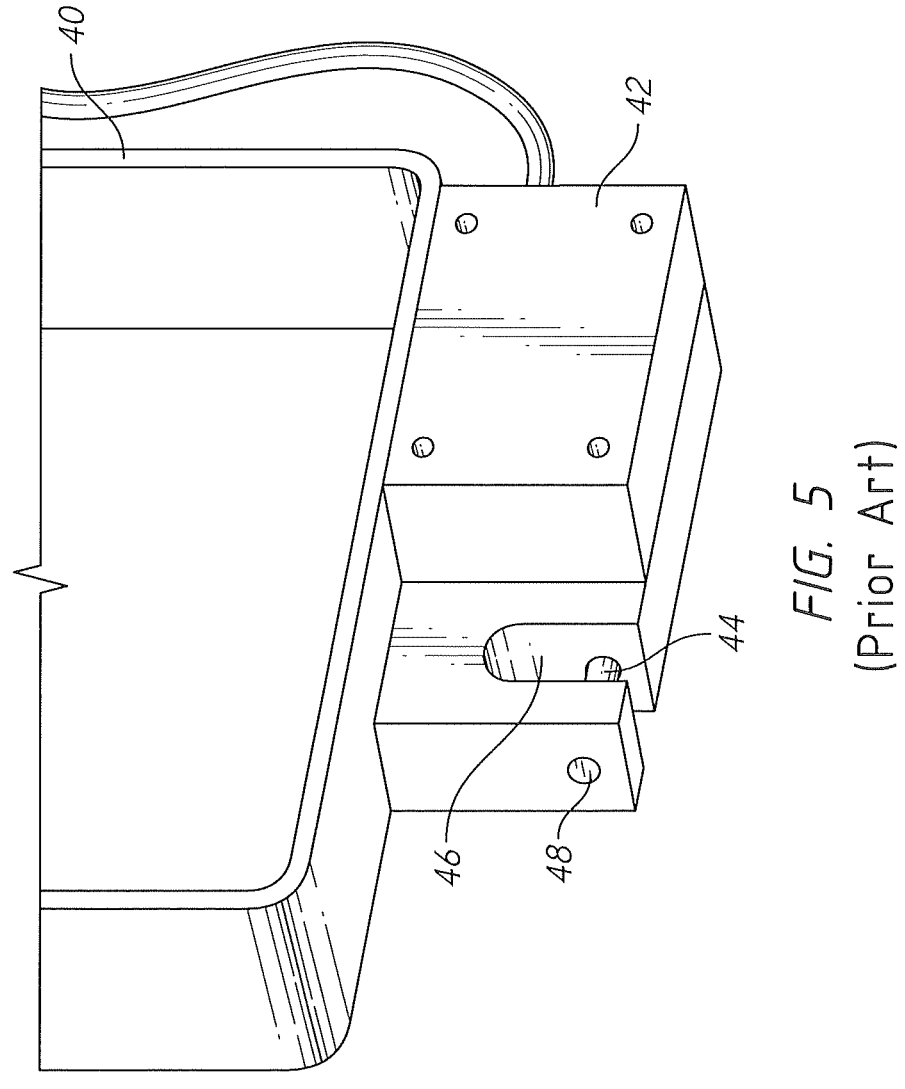
FIG. 5 is a detailed perspective view, showing the release unit of FIG. 4.
Figure 6:
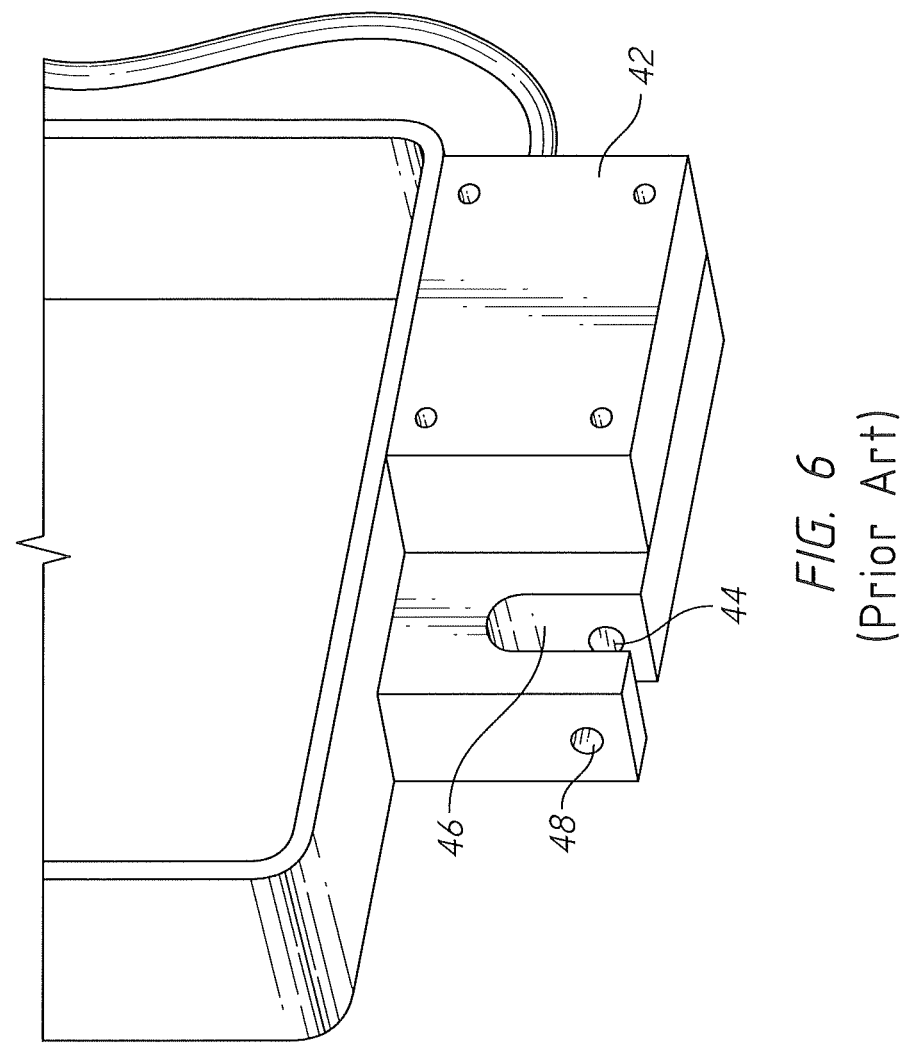
FIG. 6 is a detailed perspective view, showing the operation of the unit of FIG. 4.

10 spoon-based device
12 canister
14 spoon
16 pivot
18 pin
ring
22 fuse assembly
24 pin bore
26 pin bore
28 drone
30 chassis
32 outrigger
34 motor
36 blade
38 skid
40 payload frame
42 release unit 44 drop shaft
46 notch
48 bore
50 device adapter
52 first adapter portion
54 second adapter portion
56 first tang portion
58 second tang portion
60 first transverse bore
62 second transverse bore
64 protrusion
66 notch
67 first mating surface
68 second mating surface
70 relief feature
72 first arcuate clamping surface
74 second arcuate clamping surface
76 first flat
78 second flat
82 hook
84 hook receiver
86 end wall
87 end wall
88 first angled surface
89 arcuate surface
90 second angled surface
91 arcuate surface
92 releasing pivot joint
102 spoon receiver

DETAILED DESCRIPTION OF THE INVENTION

The following descriptions pertain to certain preferred embodiments of the invention. Having reviewed this disclosure, many other embodiments will occur to those skilled in the art. Thus, the scope of the invention should be fixed by the claims rather than the specific embodiments described.

Figure 7:
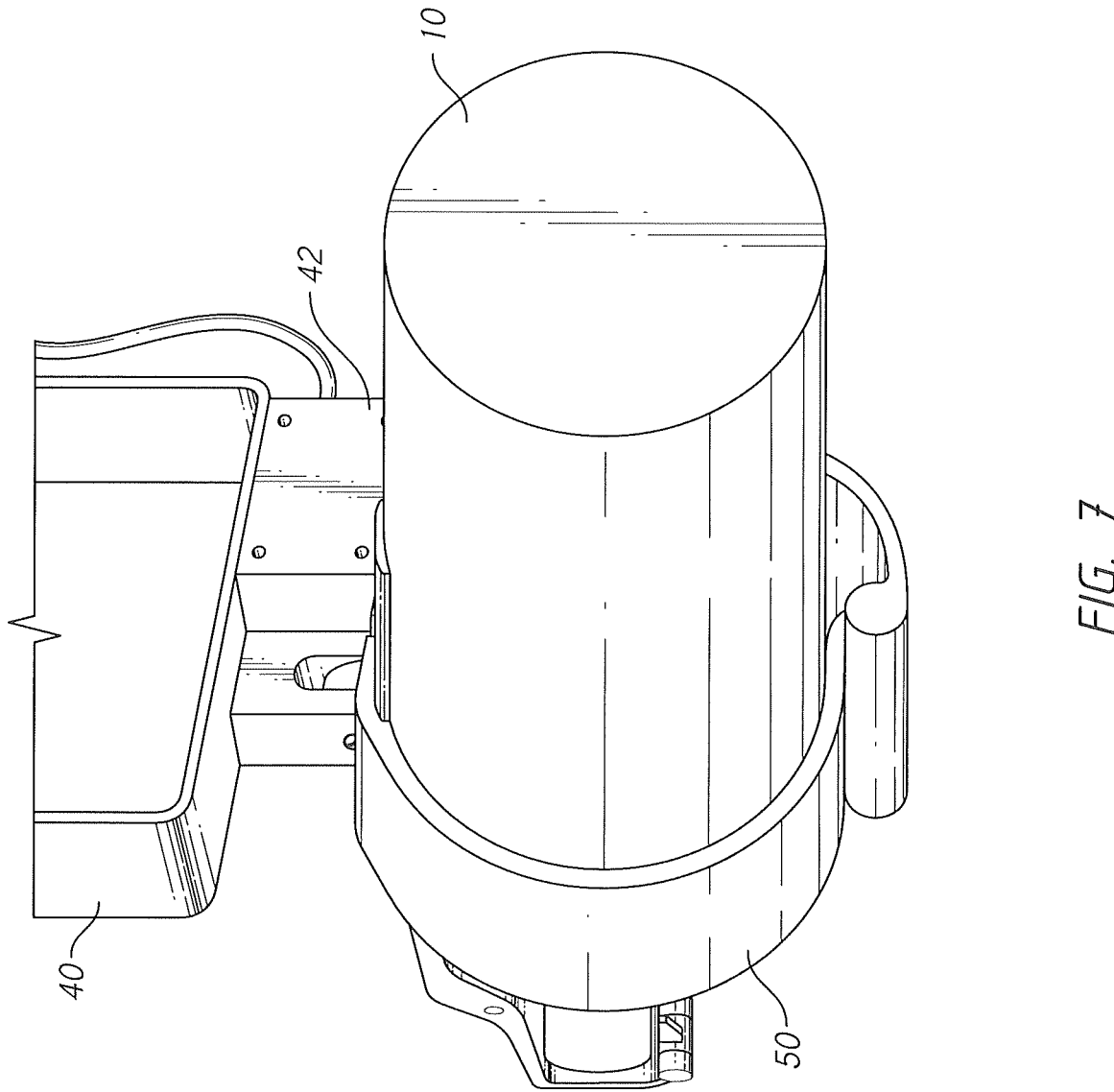
FIG. 7 is a perspective view, showing the present invention in operation.

FIG. 7 shows a preferred embodiment of the invention in operation. Device adapter 50 attaches to spoon-based device 10. An upward-extending protrusion from device adapter 50 extends up into release unit 42 mounted on payload frame 40 of the drone. When the release unit is actuated, device adapter 50 and spoon-based device 10 both fall free from the drone.

Figure 8:
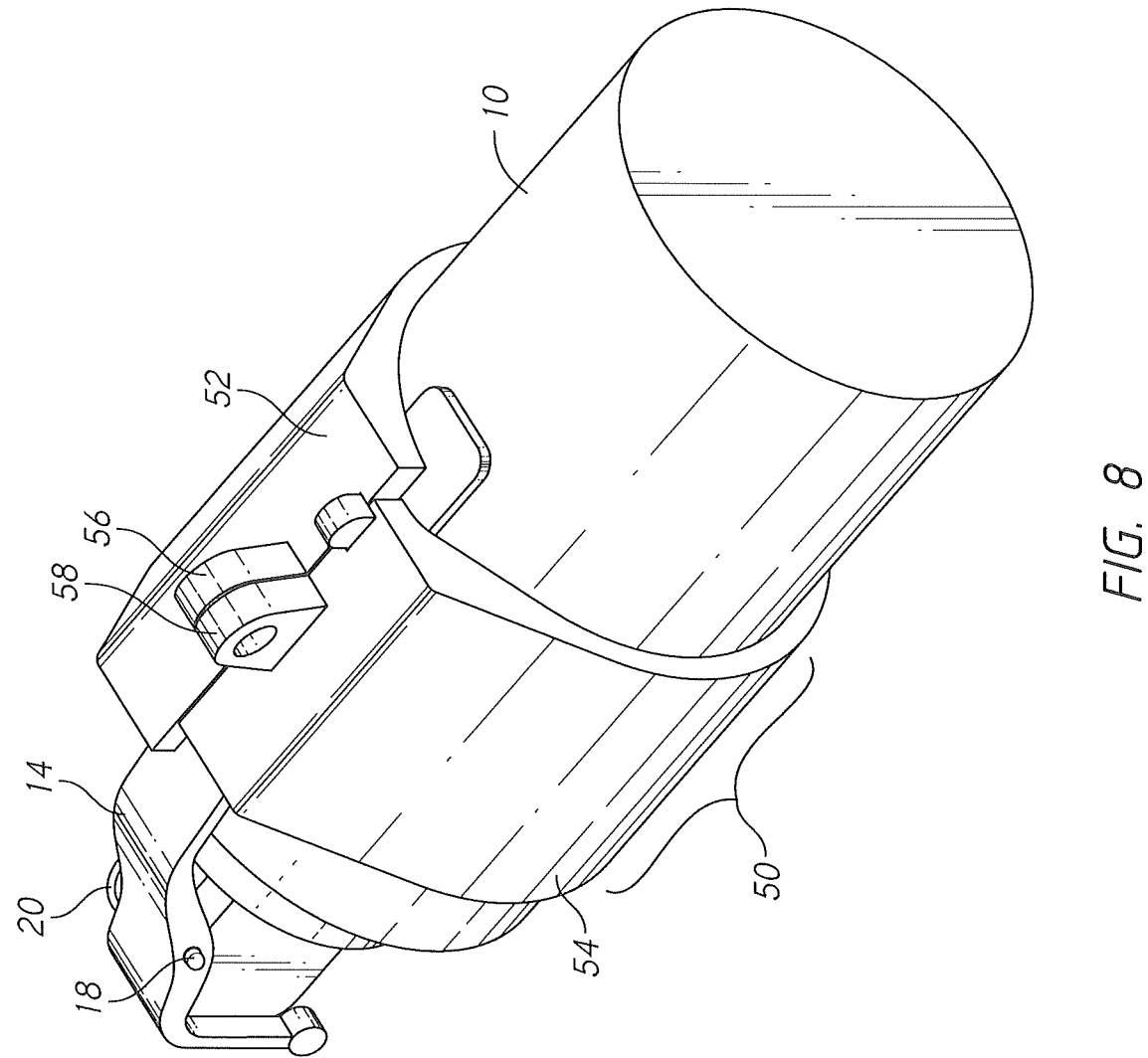
FIG. 8 is a perspective view, showing the components of the resent invention attached to a spoon-based device.

Having described the basic operating principle, the details of some embodiments of the adapter device will now be provided. FIG. 8 shows an assembly of spoon-based device 10 and device adapter 50. Device adapter 50 is divided into two portions that link together around spoon-based device 10. As shown, spoon 14 is in the "safe" position—tucked against the body of the spoon-based device. Pin 18, along with its connected ring 20, rests within the pin bores. As explained previously, the spoon-based device cannot be actuated without first pulling the pin.

First tang portion 56 extends upward from first adapter portion 52. Second tang portion 58 extends upward from second adapter portion 54. A pivot joint is provided between first adapter portion 52 and second adapter portion 54—with the pivot joint being opposite the position of the two tang portions (hidden from view in FIG. 8). In order to install device adapter 50 around spoon-based device 10, the user opens the pivot joint to so that the tang portions 56,58 are separated. The user next slides adapter 50 into place over the body of the spoon-based device. The user next presses together the two tang portions 56,58 to clamp the adapter portions 52, 54 inward against spoon-based device 10.

Figure 9:
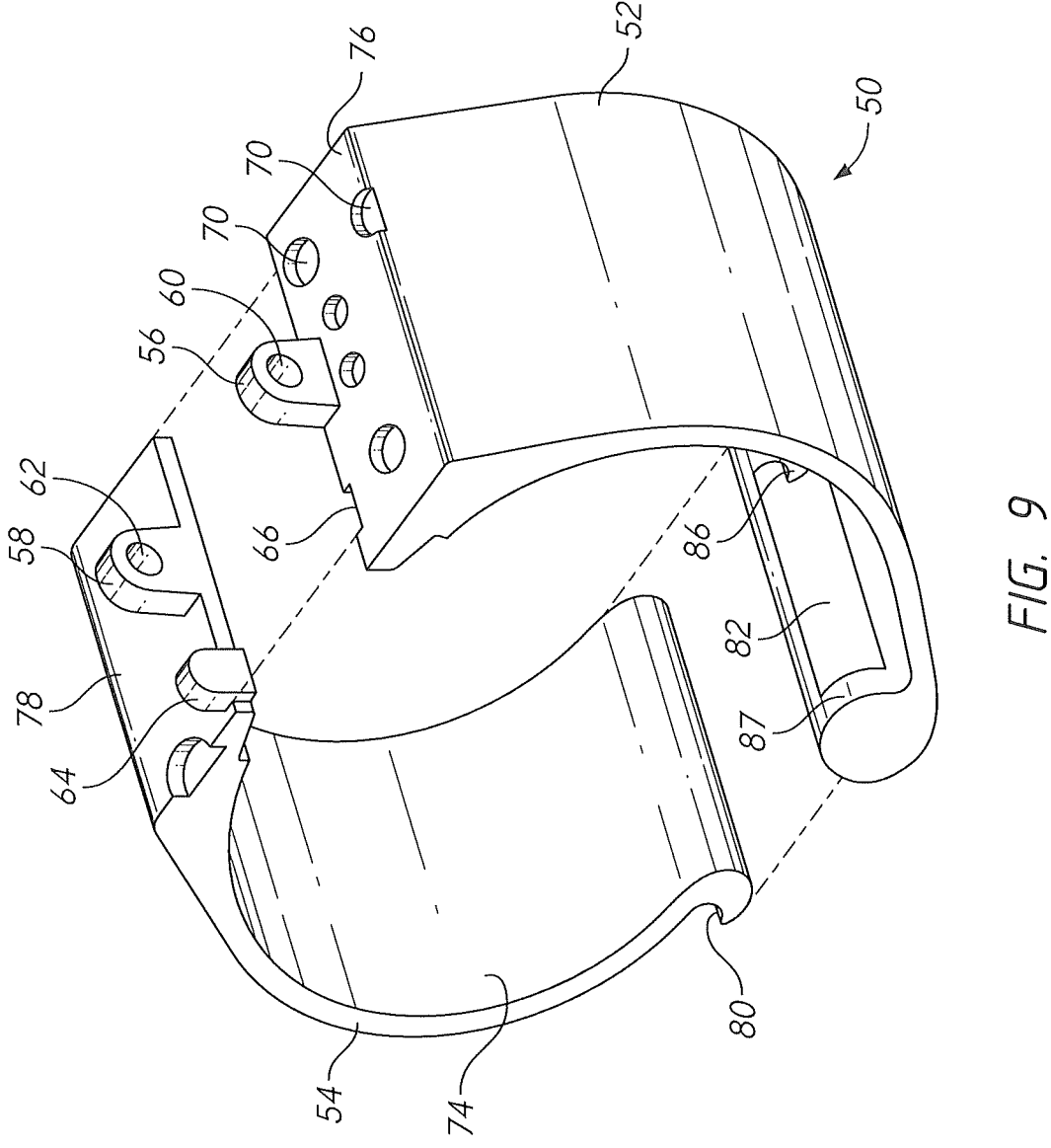
FIG. 9 is an exploded perspective view, showing first and second adapter portions.

FIG. 9 shows an exploded view of first adapter portion 52 and second adapter portion 54. The adapter can be assembled and held in any desired orientation. However, it is preferable to assemble the device in the orientation shown—with tang portions 56,58 extending upward from first flat 76 and second flat 78 proximate the top of the assembly (Directional terms such as "top" and "upward" being understood within the orientation of the view). A pivot joint is provided proximate the lower end of the assembly—approximately opposite the position of the tang portions. In the example shown, the pivoting joint is provided by hook 80 on second adapter portion 54 sliding into hook receiver 82 on first adapter portion 52. End walls 86,87 keep the hook from sliding laterally out of the hook receiver.

Those skilled in the art will readily perceive how hook 80 can be engaged within hook receiver 82, and the assembly can be pivoted to a "closed" position by urging the two tang portions 56,58 together. Mating surface 68 on second adapter portion 54 mates to a corresponding and opposing mating surface on first adapter portion 52. Once the two tang portions are urged together, first transverse bore 60 aligns with second transverse bore 62. Protrusion 64 on second adapter portion 54 also seats into notch 66 on first adapter portion 52. This engagement helps ensure the proper alignment of the two portions 52,54. The upstanding portion of protrusion 64 also ensures that the assembled adapter 50 is loaded into a drone release unit in the proper orientation. The shape and location of protrusion 64 will depend upon the particular release unit the adapter 50 is designed to engage. Other relief features 70 can be provided as needed. As an example, a group of relief features 70 can be provided in order to allow clearance for screws or rivets on the drone's payload frame or release unit.

Figure 10:
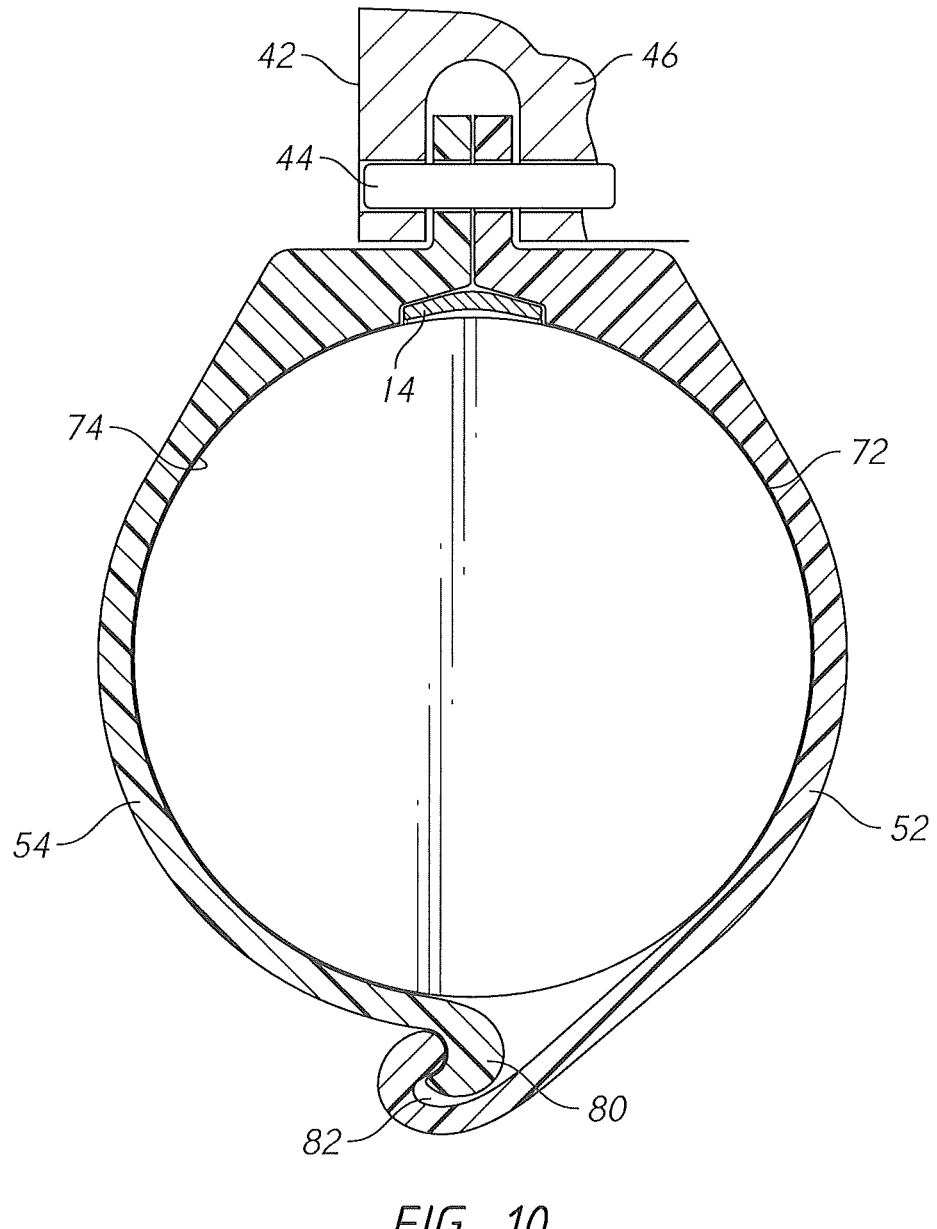
FIG. 10 is a sectional elevation view, showing how the first and second adapter portions are secured together.

FIG. 8 shows device adapter 50 clamped around spoon-based device 10. The assembly is ready to be engaged to a release unit on a drone. FIG. 10 illustrates this engagement. FIG. 10 provides a section view through the adapter portions (52,54), release unit 42, and drop shaft 44. The reader will note the pivot joint created by hook 82 and hook receiver 82. The two tang portions have been pressed together to effectively create a single upward extending tang with a transverse bore. First adapter portion 52 has first arcuate clamping surface 72 clamping inward and frictionally engaging the body of spoon-based device 10. Second adapter portion 54 has second arcuate clamping surface 74 clamping inward and engaging as well.

At this point drop shaft 44 is commanded open—which causes the shaft to retract to the right and clear of the notch 46 in release unit 42. The two tang portions are moved upward and into the slot. The transverse bores through the two tang portions are aligned with the drop shaft and the drop shaft is commanded to close. The flats 76,78 on the upper surface of the adapter portions are preferably designed so that when the flats are pressed upward against the bottom of the release unit, the transverse bore through the tang portions will rest at the proper position to receive the drop shaft.

In looking at the assembly of FIG. 10, the reader will note that spoon 14 is clamped securely inward against the body of spoon-based device 10. The reader will also note that the components cannot come disengaged unless drop shaft 44 is moved out of the tang. The assembly can be left in this configuration for an extended period if desired. However, once the drone operator is ready to transport the spoon-based device to a desired drop location and deploy it, the user pulls the pin free of the fuse assembly on the spoon-based device. As those skilled in the art will know, only the retention of spoon 14 against the body prevents the actuation of the spoon-based device once the pin is removed. The invention holds the spoon firmly in the safe position until deployment is commanded.

FIG. 11 provides a detailed view of the releasing pivot joint 92 created between hook 80 and hook receiver 82. Arcuate surface 89 on hook 80 slides smoothly along arcuate surface 91 on hook receiver 82. This interaction allows a smooth pivot joint. Further, the joint is a releasing pivot joint (denoted as releasing pivot joint 92). The pivot joint is said to be "releasing" because the hook and hook receiver can be disengaged—which allows the two adapter portions to be free of each other.

FIGS. 12 and 13 provide detailed views of the region around first and second tang portions 56,58. These two figures also illustrate the start of the drop sequence. Once the drone operator maneuvers the drone to a desired drop point, the operator sends a command to the release unit—which then moves the drop shaft free of the tang portions. FIG. 12 shows the assembly immediately after the drop shaft has been pulled free of transverse bores 60,62. At this instant first tang portion 56 is still pressed laterally against second tang portion 58. However, with the drop shaft pulled free, other forces begin to work immediately. Spoon 14 is of course spring-biased to pop outward away from the body of the spoon-based device. In the orientation shown in FIG. 12, the portion of spoon 14 shown pushes upward against the inward facing surfaces of first adapter portion 52 and second adapter portion 54.

In the particular embodiment shown, a spoon receiver 102 is provided. Angled surfaces 88, 90 are provided in the spoon receiver. As the spoon moves upward, these angled surfaces will tend to cause the tang portions 56,58 to move apart. This is shown in FIG. 13. Spoon 14 moves upward as shown by the arrow. First tang portion 56 moves to the right and second tang portion 58 moves to the left. Mating surfaces 67,68 fly away from each other. Angled surfaces 88, 90 provide a camming action as the spoon moves. The reader should recall the pivot joint on the far side of the assembly. The action of the pivot joint—at least for the time it remains connected—cause the two adapter portions 52, 54 to rotate away from each other as shown.

Figure 15:
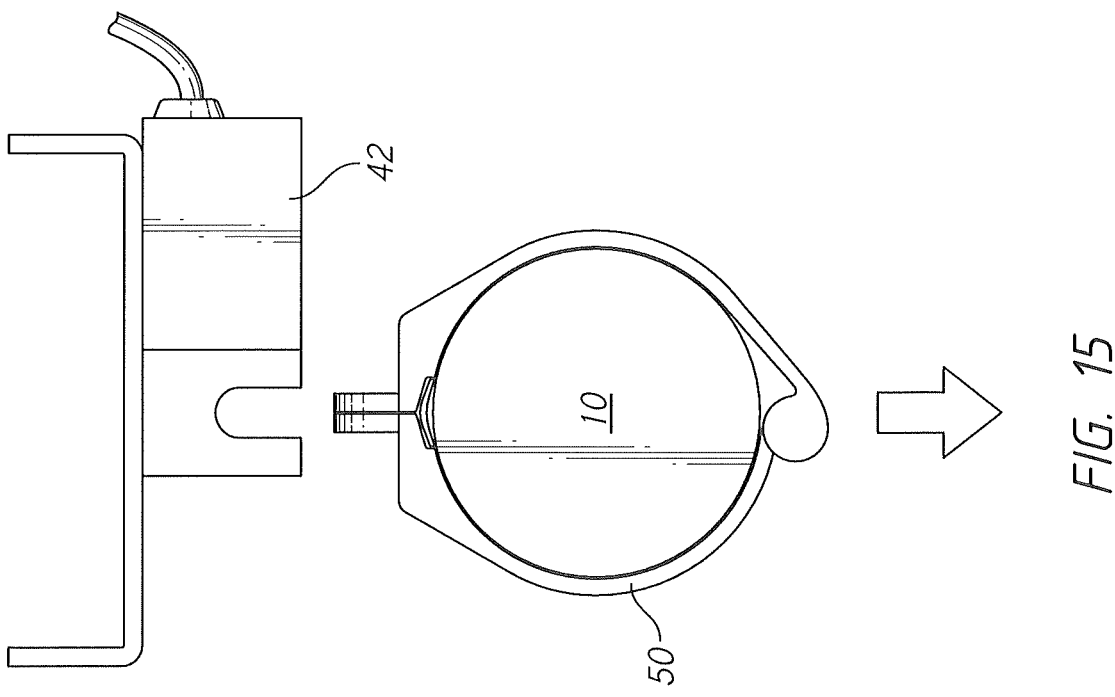
FIG. 15 is an elevation view, showing the dropping of the spoon-based device with the first and second adapter portions attached.
Figure 14:
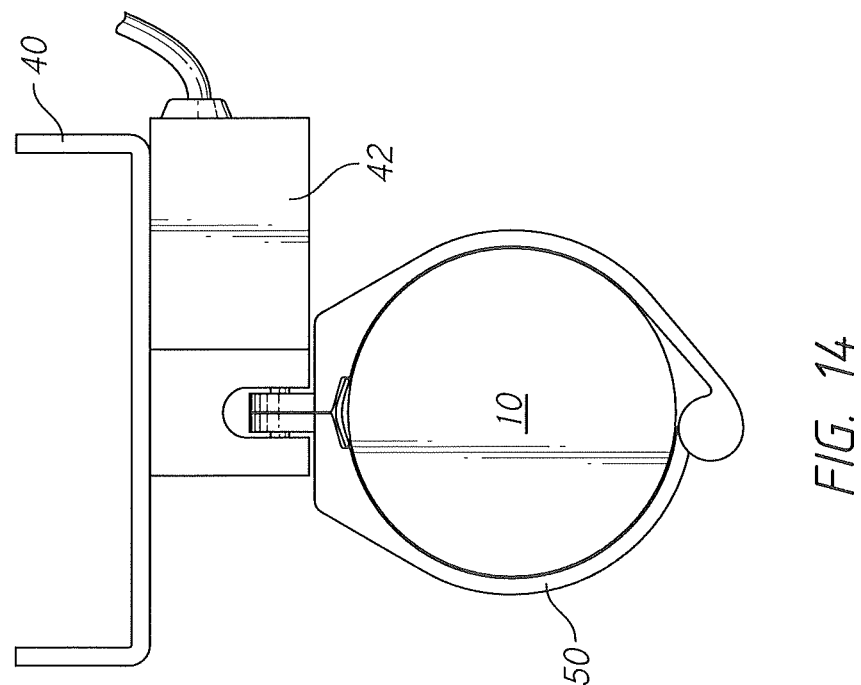
FIG. 14 is an elevation view, showing the present inventive system securing a spoon-based device to a drone.

FIGS. 14-17 show the drop sequence and the motions of the components involved. In FIG. 14, spoon-based device is clamped within device adapter 50 and secured to release unit 42 on a drone. In FIG. 15, the drop shaft has been pulled free and adapter 50 and spoon-based device 50 fall free in unison.

Figures 16, 17:
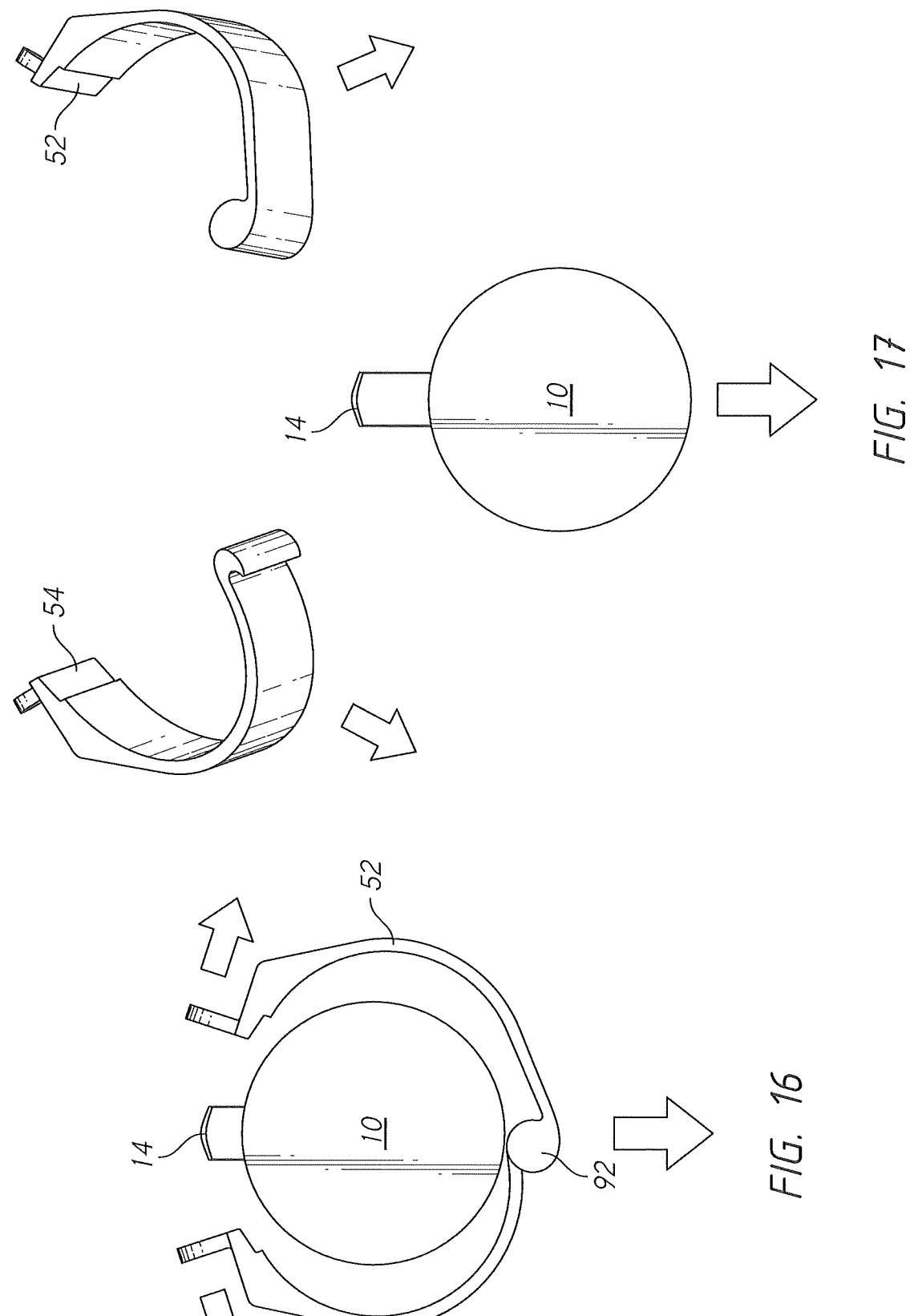
FIG. 16 is an elevation view, showing the first and second adapter portions rotating away from the spoon-based device.
FIG. 17 is an elevation view, showing the first and second adapter portions flying free from the spoon-based device.

In FIG. 16 spoon 14 has pivoted away from the body and forced the tang portions of the first and second adapter portions 52,54 apart. Releasing pivot joint 92 is still connected so the two adapter portions remain close to the spoon-based device (all falling together). In FIG. 17 the continued rotation of the first and second adapter portions has caused the releasing pivot joint to come apart—hook 80 has pulled free of hook receiver 82—and the two adapter portions 52,54 fly free of the spoon-based device 10. Once the fuse has run, the spoon-based device actuates. This may occur before or after it hits the ground.

The two adapter portions 52,54 also fall to the ground. It is therefore preferable to make these of relatively low-density materials so that they will not cause an injury (The falling canister of a spoon-based device itself obviously poses a hazard but the adapter portions preferably do not add to this hazard). The adapter portion can be made of molded thermoplastic. Reinforcing fibers can be added for extra strength in some embodiments.

Many other variations will occur to those skilled in the art. Some features of the variations, which may be combined as well, are included in the following list:

1. The pivoting hinge need not be directly opposite the tang portions, but may instead be part way around the circumference created by the first and second adapter portions;
2. The spoon-based device can assume many and varied forms. In some versions the spoon is pivotally connected directly to the body rather than the fuse assembly. An embodiment of the present invention can be adapted to this configuration;
3. The pivot joint may be a simple hinge assembly that keeps the first and second adapter portions linked as they fall away from the spoon-based device upon deployment;
4. An embodiment that does not include a spoon receiver, but instead just uses the arcuate clamping surfaces to hold the spoon as well as the spoon-based device;
5. Friction enhancing features may be added to the arcuate clamping surfaces—such as anti-skid tape; and
6. The arcuate clamping surfaces may assume another shape—such as hexagonal or octagonal—in which case the points would make contact with the body of the spoon-based device.

The preceding descriptions contains significant detail regarding the novel aspects of embodiments of the present invention. It should not be construed, however, as limiting the scope of the invention but rather as providing illustrations of the preferred embodiments of the invention. Thus, the scope of the invention should be fixed by the claims ultimately presented, rather than by the examples given.

Having described our invention, we claim:

1. A method for releasably securing a spoon-based device to a drone, where said drone includes a release unit with a sliding drop shaft, comprising:

(a) providing a spoon-based device, including,
  (i) a body,
  (ii) a fuse assembly attached to said body,
  (iii) a spoon pivotally attached to said fuse assembly,
  (iv) a pin passing through a first pin bore in said spoon and a second pin bore in said fuse assembly,
  (v) wherein said fuse assembly is activated by said spoon pivoting from a safe position adjacent to said body to a firing position away from said body;
(b) providing a device adapter, including,
  (i) a first adapter portion including a first clamping surface, a first tang portion, and a first transverse bore in said first tang portion,
  (ii) a second adapter portion including a second clamping surface, a second tang portion, and a second transverse bore in said second tang portion,
  (iii) a pivot joint between said first and second adapter portions, with said pivot joint being opposite said first and second tang portions,
  (iv) a spoon receiver on an inward facing surface of said device adapter;
(c) placing said device adapter around said body of said spoon based device with said first and second clamping surfaces clamping inward on said body and said spoon lying within said spoon receiver; and
(d) placing said drop shaft of said release unit through said first transverse bore in said first tang portion and said second transverse bore in said second tang portion, thereby connecting said spoon-based device to said drone.

2. The method for releasably securing said spoon-based device to said drone as recited in claim 1, further comprising pulling said pin free of said spoon-based device.

3. The method for releasably securing said spoon-based device to said drone as recited in claim 2, further comprising sliding said drop shaft to an open position, whereby said device adapter and said spoon-based device are released from said drone.

4. The method for releasably securing said spoon-based device to said drone as recited in claim 3, wherein said drop shaft moves to said open position in response to a command sent to said drone.

5. The method for releasably securing said spoon-based device to said drone as recited in claim 3, further comprising said drone carrying said attached device adapter and spoon-based device to a desired drop position before sliding said drop shaft to said open position.

6. The method for releasably securing said spoon-based device to said drone as recited in claim 1, further comprising:

(a) providing a releasing pivot joint for said pivot joint between said first and second adapter portions;

(b) whereby said first and second adapter portions are configured to separate from said spoon-device and from each other after said sliding drop shaft releases said first and second adapter portions.

7. The method for releasably securing said spoon-based device to said drone as recited in claim 6, further comprising:

(a) providing said first adapter portion with a hook receiver;

(b) providing said second adapter portion with a hook configured to fit within said hook receiver; and (c) said hook and said hook receiver together defining said releasing pivot joint.

8. The method for releasably securing said spoon-based device to said drone as recited in claim 5, wherein following said release of said device adapter and said spoon-based device from said drone, said spoon pivoting outward away from said body, thereby urging said first tang portion away from said second tang portion and opening said pivot joint between said first and second adapter portions.

9. The method for releasably securing said spoon-based device to said drone as recited in claim 6, wherein:

(a) following said release of said device adapter and said spoon-based device from said drone, said spoon pivoting outward away from said body, thereby urging said first tang portion away from said second tang portion and opening said pivot joint between said first and second adapter portions; and (b) as said first tang portion moves further away from said second tang portion said releasing pivot joint releases and said first and second adapter portions separate from each other.

10. The method for releasably securing said spoon-based device to said drone as recited in claim 7, wherein:

(a) following said release of said device adapter and said spoon-based device from said drone, said spoon pivoting outward away from said body, thereby urging said first tang portion away from said second tang portion and opening said pivot joint between said first and second adapter portions; and (b) as said first tang portion moves further away from said second tang portion said hook moves free of said hook receiver and first and second adapter portions separate from each other.

11. A method for releasably securing a spoon-based device to a drone, where said drone includes a release unit with a movable drop shaft, comprising:

(a) providing a spoon-based device, including, (i) a body, (ii) a fuse assembly attached to said body, (iii) a spoon pivotally attached and configured to rest in a safe position close to said body and move to an actuation position away from said body, (iv) a pin passing through a first pin passage in said spoon, said pin configured to retain said spoon in said safe position, (v) wherein said fuse assembly is activated by said spoon pivoting from a safe position adjacent to said body to a firing position away from said body;

(b) providing a device adapter, including, (i) a first adapter portion including a first clamping surface, a first tang portion, and a first transverse opening through said first tang portion, (ii) a second adapter portion including a second clamping surface, a second tang portion, and a second transverse opening through said second tang portion, (iii) a pivot joint pivotally connecting said first and second adapter portions, with said pivot joint being remote from said first and second tang portions, (iv) a spoon receiver on an inward facing surface of said device adapter;

(c) placing said device adapter around said body of said spoon-based device with said first and second clamping surfaces clamping inward on said body and said spoon being clamped against said body; and (d) placing said drop shaft of said release unit through said first transverse opening in said first tang portion and said second transverse opening in said second tang portion, thereby connecting said spoon-based device to said drone.

12. The method for releasably securing said spoon-based device to said drone as recited in claim 11, further comprising pulling said pin free of said spoon-based device.

13. The method for releasably securing said spoon-based device to said drone as recited in claim 12, further comprising sliding said drop shaft to an open position, whereby said device adapter and said spoon-based device are released from said drone.

14. The method for releasably securing said spoon-based device to said drone as recited in claim 13, wherein said drop shaft moves to said open position in response to a command sent to said drone.

15. The method for releasably securing said spoon-based device to said drone as recited in claim 13, further comprising said drone carrying said attached device adapter and spoon-based device to a desired drop position before sliding said drop shaft to said open position.

16. The method for releasably securing said spoon-based device to said drone as recited in claim 11, further comprising:

(a) providing a releasing pivot joint for said pivot joint between said first and second adapter portions;

(b) whereby said first and second adapter portions are configured to separate from said spoon-device and from each other after said sliding drop shaft releases said first and second adapter portions.

17. The method for releasably securing said spoon-based device to said drone as recited in claim 16, further comprising:

(a) providing said first adapter portion with a hook receiver;

(b) providing said second adapter portion with a hook configured to fit within said hook receiver; and (c) said hook and said hook receiver together defining said releasing pivot joint.

18. The method for releasably securing said spoon-based device to said drone as recited in claim 15, wherein following said release of said device adapter and said spoon-based device from said drone, said spoon pivoting outward away from said body, thereby urging said first tang portion away from said second tang portion and opening said pivot joint between said first and second adapter portions.

19. The method for releasably securing said spoon-based device to said drone as recited in claim 16, wherein:

(a) following said release of said device adapter and said spoon-based device from said drone, said spoon pivoting outward away from said body, thereby urging said first tang portion away from said second tang portion and opening said pivot joint between said first and second adapter portions; and (b) as said first tang portion moves further away from said second tang portion said releasing pivot joint releases and said first and second adapter portions separate from each other.

20. The method for releasably securing said spoon-based device to said drone as recited in claim 17, wherein:

(a) following said release of said device adapter and said spoon-based device from said drone, said spoon pivoting outward away from said body, thereby urging said first tang portion away from said second tang portion and opening said pivot joint between said first and second adapter portions; and (b) as said first tang portion moves further away from said second tang portion said hook moves free of said hook receiver and first and second adapter portions separate from each other.

* * * * *